J. JACQUET.
Footstool and Foot Warmer.
No. 88,388.                            Patented May 30, 1869.
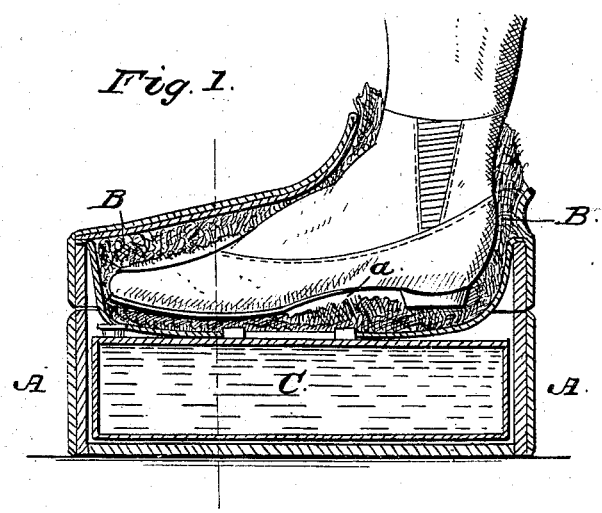
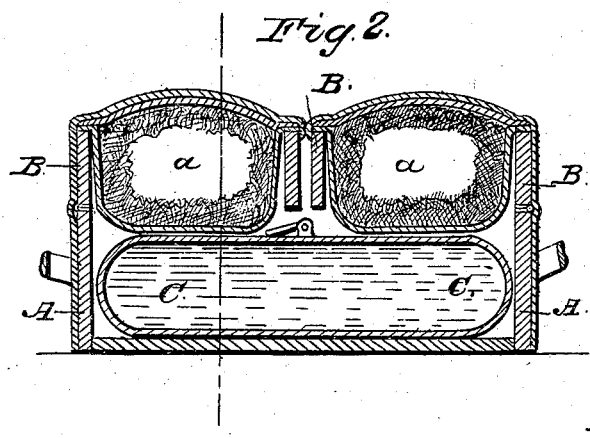

JACQUES JACQUET, OF NEWARK, NEW JERSEY.

Letters Patent No. 88,388, dated March 30, 1869.

COMBINED FOOTSTOOL AND FOOT-WARMER.

The Schedule referred to in these Letters Patent and making part of the same.

*To all whom it may concern:*

Be it known that I, JACQUES JACQUET, of Newark, in the county of Essex, and State of New Jersey, have invented a new and improved Combined Footstool and Foot-Warmer; and I do hereby declare that the following is a full, clear, and exact description thereof, which will enable others skilled in the art to make and use the same, reference being had to the accompanying drawings, forming part of this specification, in which—

Figure 1 represents a vertical longitudinal section of my improved foot-warmer.

Figure 2 is a vertical transverse section of the same.

Similar letters of reference indicate like parts.

The object of this invention is to produce an apparatus for travellers and others, which shall at once serve as a convenient footstool and also as a foot-warmer in winter.

The invention consists of a hollow footstool, the cover of which is hinged, to allow the insertion of a box filled with hot water, while in the cover two felt or fur-coated pockets are formed for the insertion of the feet. Thereby a comfortable article is provided, by which travellers and people of sedentary habits can, in winter-time, keep their feet warm, while, at other times, it serves as a convenient footstool for ladies.

A, in the drawing, represents a box, made of wood, or other suitable material, of suitable form and size.

It is provided with a hinged cover, B, which is either formed in two leaves, as shown in fig. 2, or of one single leaf, as may be desired.

The cover is made of fur, or other suitable material, and is provided with two pockets, *a a*, as shown in fig. 2, for the insertion of the feet. There is a sheet-metal box, which can be filled with hot water, or other heating-material. The box can be covered with suitable ornamental material.

When this instrument is not to be used as a foot-warmer, it can, as will readily be seen, be employed as a convenient footstool, the cover being soft and comfortable.

Having thus described my invention,

I claim as new, and desire to secure by Letters Patent—

A combined footstool and foot-warmer, consisting of the box A, with the hinged cover B, said cover having the foot-receptacles *a*, and of the heating-box C, all made and operating substantially as herein shown and described.

J. JACQUET.

Witnesses:
  JULES BEVIN,
  C. J. PERGEAUX.